3,792,048
PROCESS FOR HYDROLYZING 3-TRIFLUORO-METHYL PHENETHYLAMINES

Nikolaus R. Hansl, Omaha, Nebr., assignor to Pacific Research Laboratories, Santa Barbara, Calif.
No Drawing. Filed Oct. 29, 1970, Ser. No. 85,283
Int. Cl. C07d 87/36
U.S. Cl. 260—247.2 R — 8 Claims

ABSTRACT OF THE DISCLOSURE

This disclosure relates to a process for hydrolyzing 3-trifluoromethyl phenethylamines to yield the corresponding benzoic acid derivatives. The process is conducted in the presence of an acid, most preferably sulfuric acid in the liquid phase. The benzoic acid compounds produced are intermediates useful in the preparation of m-substituted amino ethyl benzoic acid esters which are active as spasmolytics and psychotherapeutic agents.

BACKGROUND OF THE INVENTION

This invention relates to a novel class of compounds having an amino-alkyl group attached to the ring of a benzoic acid ester or amide, the compounds exhibit spasmolytic, cholinergic and central nervous system effects.

A general structure as displayed in the present invention has not been previously disclosed because of the difficulty in obtaining intermediate compounds.

This difficulty was overcome by reacting a trifluoromethylphenyl Grignard reagent with an appropriate starting material to yield a hydroxy alkyl or amino alkyl structure having two groups attached to the benzene nucleus which are subsequently selectively chemically controlled to yield the eventual products.

SUMMARY

This invention relates to a group of amino-lower-alkyl-benzoic acid esters or amides having the general structural formula:

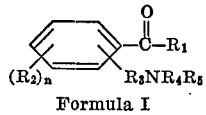

Formula I in which $R_1$ is selected from the group of a lower alkoxy, $R_2$ is a hydrogen or halogen atom or selected from the group of alkyl, alkoxy, aryl, substituted aryl or aralkyl or a disubstitution such as dioxymethylene or other resulting in the formation of a bicyclic or a polycyclic ring system, and $n$ is equal to 1–4. $R_3$ is a lower alkyl of one to six carbons which may be linear, branched, or cyclic; $R_4$ and $R_5$ represent hydrogen or an alkyl group, an aralkyl or an alkylaryl group or a heterocyclic group. The symbol —$NR_4R_5$ may also represent a heterocyclic ring system.

DESCRIPTION OF THE PREFERRED EMBODIMENT

It has been discovered according to the present invention that amino-lower-alkyl-benzoic acid derivatives exhibit cholinergic activity, have spasmolytic properties, affect the central nervous system, and facilitate certain parameters of intellectual performance in the experimental animal and in man. These compounds can be administered for prolonged periods of time without producing undesirable side effects as determined by standard pharmacological evaluation. The compounds of this invention encompass both the free base form of the amines and the conventional derivatives thereof, such as the acid addition salts and quarternary ammonium halide salts thereof.

The compounds in their pharmaceutically acceptable forms of the above description are useful as spasmolytics and psychotherapeutic agents, in addition to being valuable intermediates in organic synthesis of derived compounds.

The spectrum of pharmacodynamic properties includes a pronounced spasmolytic action as demonstrated by the effect on the isolated ileum stimulated by such spasmogens as acetyl choline, barium chloride and histamine. Using papaverine as a standard, the following table demonstrates the comparable activity found as a result of this test.

SPASMOLYTIC ACTIVITY IN THE ISOLATED RABBIT ILEUM

| | Percent |
|---|---|
| Papaverine | 100 |
| Preparation 5 | 300 |
| Preparation 6 | 300 |
| Preparation 7 | 30 |
| Preparation 8 | 80 |
| Preparation 9 | 50 |
| Preparation 10 | 300 |
| Preparation 11 | 100 |

There are also demonstrable effects on the central nervous system of intact animals in vivo as well as effects on blood pressure and respiration.

Compounds of this design exhibit antidepressant activity, mood elevation, and stimulation of the central nervous system. Tranquilizing effects are demonstrable without any evidence of accompanying sedation or drowsiness which is a definite advantage for compounds of this type of action. In a comparative animal study of Preparation 5 (benzoic acid, m-[2-(benzyl-methylamino)-ethyl] methylester) and established drugs of this type, a therapeutic profile in the central nervous system area showed:

| | Preparation 5 [1] | Chlordiazepoxide HCl | Chlorpromazine | Meprobamate | Phenobarbital |
|---|---|---|---|---|---|
| Taming below ataxic dose | + | + | 0 | 0 | 0 |
| Taming at ataxic dose | + | + | + | + | + |
| Hypnosis at taming dose | 0 | 0 | 0 | + | + |
| Muscle relaxation | 0 | + | + | + | + |
| Appetite stimulation | + | 0 | 0 | 0 | 0 |
| Antidepressant activity | + | 0 | 0 | 0 | 0 |

[1] The therapeutic profile of preparations 5 to 11 is similar in most critical parameters.

These compounds are useful psychotherapeutic agents.

Both acquisition and memory retention appear improved in the experimental animal. Standard avoidance response tests using negative reinforcement (electric shock) as well as maze tests using positive reinforcement (water reward) were conducted using rats as the experimental animal. Using Preparation 5, benzoic acid, m-[2-(benzyl-methylamino)-ethyl] methyl ester, as the test compound, it was found that a compound of this structure facilitates the rats' acquisition and increases subsequent retention.

These compounds have a very useful spectrum of activities; combined with an extraordinary activity in some parameters, they are practically devoid of tissue irritancy effects. Systemic toxicity of these compounds is very low also, Preparation 5 for example was found to have an oral $LD_{50}$ of 500–700 mg./kg. in mice.

Reproduction studies have been carried out through two offspring generations and no evidence of malformation has been found whatever.

Pathological examination of brains, livers, and other organs of rats at termination of chronic toxicity studies revealed no evidence of pathological changes due to drug action.

Tolerance studies have been carried out in the dog and monkey where the compounds were found well tolerated in doses as high as 50 mg./kg.

Several methods of preparing the compounds of Formula II may be employed, each residing in the concept of making substituted benzoic acid esters or amides by a process which includes the steps of reacting a trifluoromethylphenylmagnesium Grignard reagent with ethylene oxide or propylene oxide or cyclohexene oxide and reacting the thusly produced alcohol with a halogenating agent such as thionyl chloride. The resulting trifluoromethylphenylalkylhalide is subsequently reacted with an amine to give a product of the following general structure:

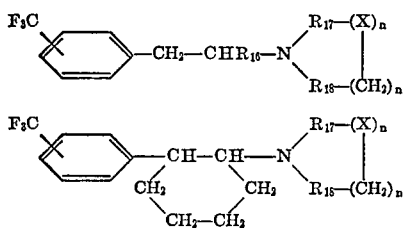

whereby $R_{16}$ is a hydrogen atom or a methyl group, X is a heteroatom and $n$ equals 0 to 3, $R_{17}$ and $R_{18}$ is a hydrogen or an alkyl group. The above amine represents either a heterocyclic ring system or a primary or non-cyclic secondary or tertiary amine.

The thusly produced trifluoromethyl compound is now hydrolyzed at the trifluoromethyl group with a suitable reagent as for example sulfuric acid, yielding the corresponding substituted benzoic acid. This hydrolysis is most preferably conducted in a liquid one phase system containing the acid addition salt of the amine or the free amine and the appropriate acid reagent. This benzoic acid derivative is now esterified in a conventional manner with the appropriate alcohol in the presence of a catalyst such as hydrochloric acid or sulfuric acid. The free base of the ester is finally converted into the stable salt such as the hydrochloride or other.

In an alternate route, the aforementioned Grignard reagent can be reacted with ethyleneimine or one of its homologues. The resultant amine can be used as such or further modified on the amino nitrogen by reacting it with an appropriate alkylating agent. The product is now subjected to hydrolysis and final conversion to the ester as described above.

In another variant the 2-aminoalkylbenzoic acid ester can be alkylated on the nitrogen to yield the corresponding secondary or tertiary amines.

In an alternate route, trifluoromethylacetophenone or trifluoromethylpropiophenone can be halogenated on the carbon adjacent to the keto group. The resultant haloketone can be reacted with an amine. The suchly obtained aminoketone can be hydrolyzed directly to the corresponding benzoic acid derivative which is converted in analogous fashion as described above to the ester and its respective salts.

In another variant the aminoketone obtained as above is reduced with an appropriate reagent such as a metal hydride and the resultant aminoalcohol is hydrolyzed at the trifluoromethyl group as above and converted in similar fashion to the corresponding benzoic acid derivative. Following above procedures, the latter compound is converted to the ester and its salts.

In another alternate route the halogenated ketone can be reduced to the corresponding alcohol via the Meerwein-Ponndorf procedure and the resultant halogenated alcohol is now reacted with an appropriate amine. The aminoalcohol so obtained is again subjected to hydrolysis as above and the benzoic acid derivative further converted to the appropriate ester or salt thereof.

In another variant the 1-hydroxy-2-aminoalkyl benzoic acid ester or amide can be alkylated to the appropriate secondary or tertiary amine. In an alternate route the halogenated ketone can be reacted with an appropriate amine. The aminoketone so obtained is again subjected to hydrolysis as above and the benzoic acid deriavtive is further converted to the appropriate amide or salt thereof.

In another variant the 1-keto-2-aminoalkyl benzoic acid ester or amide can be alkylated to the appropriate secondary or tertiary amine.

Following different routes, it is possible to obtain amino alkyl benzoic acids by reduction or by hydrolysis of the corresponding nitriles. The thusly obtained amino alkyl benzoic acids are then further modified by such procedures as N-alkylation or o-alkylation for example, and are esterified or amidified at their carboxy group.

The free benzoic acid derivatives can be converted to their corresponding acid halides which on reacting with amines will yield the desired amides.

An alternate route to amides utilizes the above mentioned esters which are reacted directly with the proper amine to yield the corresponding amides.

In an alternate route a benzoic acid alkyl alcohol such as m-(2-hydroxy-ethyl) benzoic acid can be converted to the acid chloride alkyl chloride compound which on reaction with amines will yield the corresponding m-(2-aminoalkyl) benzoic acide amide.

In another variant the 1-keto-2-amino alkyl benzoic acid can be converted to the corresponding acid choride which on reaction with an appropriate amine will yield the corresponding amide.

In an alternate route the 1-hydroxy-2-amino alkyl benzoic acid ester can be reacted with an amine to yield the corresponding amide.

In another variant the 1-keto-2-amino alkyl benzoic acid ester can be reacted with an amine to yield the corresponding amide.

Preferred among the compounds of this invention are those wherein the side chain is in 3 position to the benzoic acid carboxy group, the lower alkyl esters of the benzoic acid derivatives particularly those with alkyl groups having 1 to 4 carbon atoms, the morpholino compounds, the compounds containing piperazine or mono or poly alkyl piperazine, the compounds containing N-benzyl-N-loweralkyl amino groups, and compounds terminating with a primary amine in the side chain or with an amino group substituted with one or two lower-alkyl groups, and those compounds having combinations of the preferred groups.

The benzoic acid derivatives of the above definition can be conveniently prepared by a sequence of reactions as outlined above. They are made accessible by the relative inertness of the trifluoromethyl group which does not interfere with preparation of the Grignard reagents. Hydrolysis of the trifluoromethyl group yields the desired benzoic acid derivatives, compounds which may be further converted to the corresponding esters or amides or their salts.

The preceding reactions can be illustrated by the following formulae.

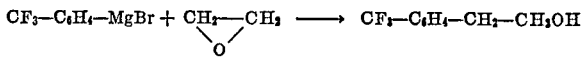

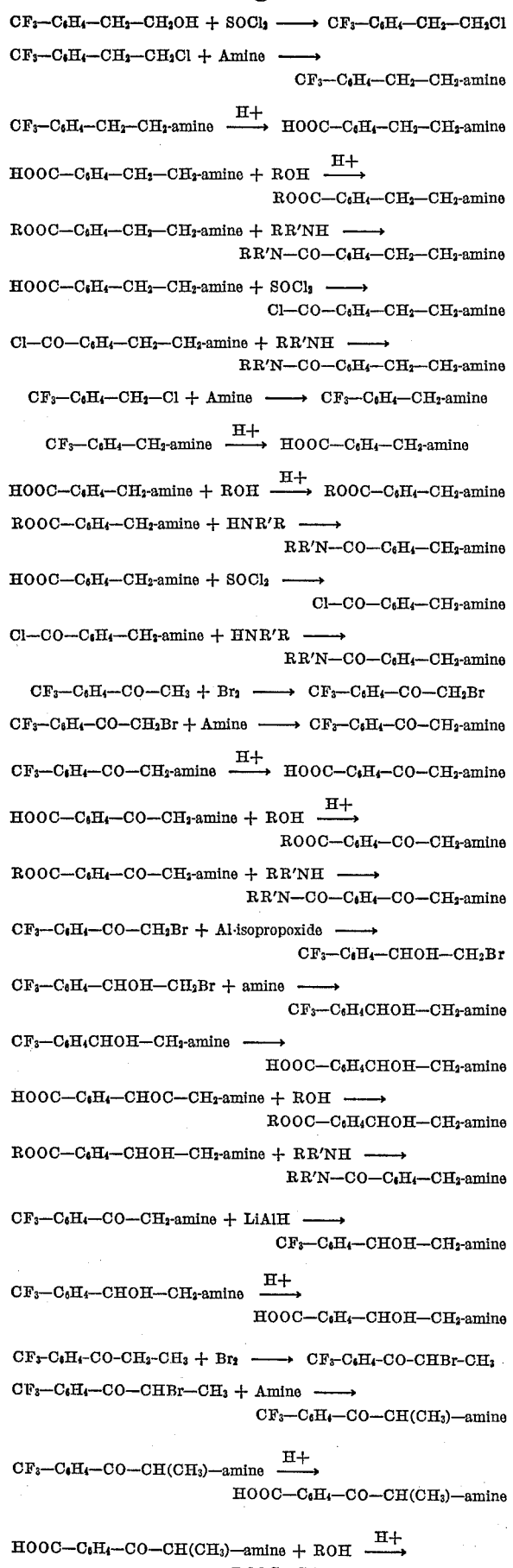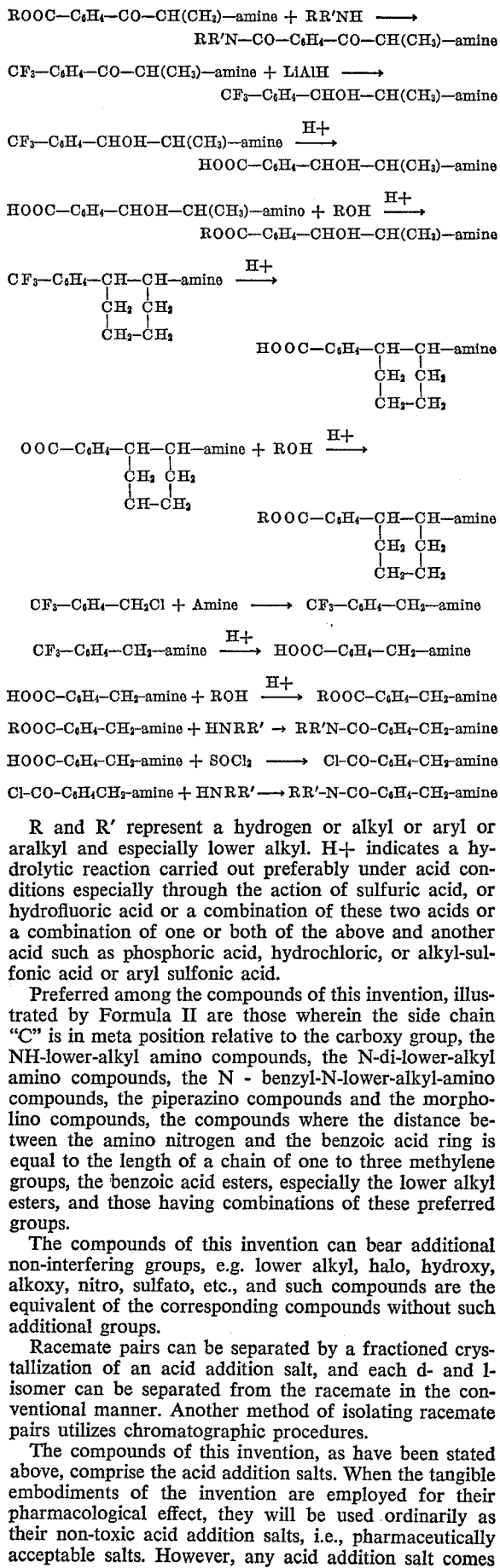

R and R' represent a hydrogen or alkyl or aryl or aralkyl and especially lower alkyl. H+ indicates a hydrolytic reaction carried out preferably under acid conditions especially through the action of sulfuric acid, or hydrofluoric acid or a combination of these two acids or a combination of one or both of the above and another acid such as phosphoric acid, hydrochloric, or alkyl-sulfonic acid or aryl sulfonic acid.

Preferred among the compounds of this invention, illustrated by Formula II are those wherein the side chain "C" is in meta position relative to the carboxy group, the NH-lower-alkyl amino compounds, the N-di-lower-alkyl amino compounds, the N - benzyl-N-lower-alkyl-amino compounds, the piperazino compounds and the morpholino compounds, the compounds where the distance between the amino nitrogen and the benzoic acid ring is equal to the length of a chain of one to three methylene groups, the benzoic acid esters, especially the lower alkyl esters, and those having combinations of these preferred groups.

The compounds of this invention can bear additional non-interfering groups, e.g. lower alkyl, halo, hydroxy, alkoxy, nitro, sulfato, etc., and such compounds are the equivalent of the corresponding compounds without such additional groups.

Racemate pairs can be separated by a fractioned crystallization of an acid addition salt, and each d- and l-isomer can be separated from the racemate in the conventional manner. Another method of isolating racemate pairs utilizes chromatographic procedures.

The compounds of this invention, as have been stated above, comprise the acid addition salts. When the tangible embodiments of the invention are employed for their pharmacological effect, they will be used ordinarily as their non-toxic acid addition salts, i.e., pharmaceutically acceptable salts. However, any acid addition salt comes within the scope of this invention as they are all useful, e.g., as intermediates in organic synthesis, and for purifying the free base or for separating racemate mixtures.

Suitable non-toxic, i.e., pharmaceutically acceptable, acid addition salts are those formed from mineral acids, such as hydrobromic acid, hydrochloric acid, hydroiodic acid, nitric acid, phosphoric acid and sulfuric acid, and organic acids, e.g., acetic acid, citric acid, hexamic acid, lactic acid, malic acid, tartaric acid, and the like, which provide the hydrobromide, hydrochloride, hydroiodide, nitrate, phosphate, or acid phosphate, sulfate or bisulfate, acetate, citrate, or acid citrate, hexamate, lactate salts, malate or acid malate, tartrate or bitartrate respectively.

The described compounds of this invention are employed in the described uses in the form of nontoxic acid addition salts and may be administered to mammalians as pure compounds. It is advisable, however, to first combine one or more of the novel compounds with a suitable pharmaceutical carrier to attain a more satisfactory size to dosage relationship.

Pharmaceutical carriers which are liquid or solid may be used, the preferred liquid carrier being water in a pharmaceutically acceptable emulsion, suspension, or solution. Flavoring materials may be included in the solutions as desired.

Solid pharmaceutical carriers such as starch, sugar, talc, mannitol and the like may be used to form powders. The powders may be given directly or incorporated in tablet, capsule or suppository preparations.

The preparations in the proper form may be given, orally, rectally, and parenterally and should be present in a concentration providing at least 0.1 milligram per unit dosage. An oral dose of 0.01 mg./kg. or more up to approximately 20 to 50 milligrams per unit dosage thrice daily in the higher mammals and about 10 to 100 times this dose in laboratory test animals parenterally is preferred.

The following preparations and examples are illustrative of the compounds of this invention and of the processes by which they can be prepared though it is to be remembered that such illustrations are not to be construed as limiting.

PREPARATION 1

3-trifluoromethyl-phenethyl-alcohol

To a refluxing and vigorously stirred solution of the Grignard reagent prepared from 100 g. (0.444 mole) 3-bromo-benzotrifluoride and 12 g. (0.5 mole) of magnesium in 400 milliliters of anhydrous ether is added an ether solution of 40 g. (0.89 mole) ethylene oxide. Reflux is maintained by the exothermic reaction and continued after completed addition for four additional hours. The reaction mixture, after cooling, is decomposed by pouring onto an iced, diluted hydrochloric acid. The ether layer is separated, washed brifly, dried and distilled. The yield of 3-trifluoromethyl phenethyl alcohol is 59 g. (65 percent), B.P. 73–76° C./0.4 mm.

PREPARATION 2

Alpha methyl-3-trifluoromethyl-phenethyl alcohol

This compound is obtained in analogous fashion to preparation 1 through the interaction of 3-trifluoromethyl-phenyl-magnesium bromide and propyleneoxide. The liquid alpha methyl-3-trifluoromethyl-phenethyl-alcohol is obtained in 50 percent yield, B.P. 80° C./1 mm.

PREPARATION 3

3-trifluoromethyl-phenethylchloride

To a refluxing mixture of 95 g. (0.8 mole) of thionyl chloride in 300 milliliters of chloroform and 0.5 g. of pyridine is added dropwise with vigorous stirring 135 g. (0.71 mole) of 3-trifluoromethyl-phenethyl-alcohol. After the addition is completed reflux is continued for two hours. Excess thionyl chloride and hydrochloric acid is removed in vacuo. The chloroform solution is briefly washed with water, bicarbonate solution, and water; it is dried and distilled. Yield 140 g. (95 percent), B.P. 98–100° C./25 mm.

The 3-trifluoromethyl-phenethyl amines are prepared by reacting the above obtained 3-trifluoromethyl-phenethyl chloride with appropriate amines.

EXAMPLE 1

N-benzyl-N-methyl-3-trifluoromethyl-phenethyl amine

A mixture of 20 g. (0.1 mole) 3-trifluoromethyl-phenethyl-chloride and 25 g. (0.2 mole) benzylmethylamine is heated for twelve hours to 100° C. On cooling the reaction mixture is acidified with aqueous hydrochloric acid. This mixture is extracted with ether. The ether insoluble portion is cooled, made alkaline with alkali hydroxide and the liberated base is extracted with ether. The ether insoluble portion is cooled, made alkaline with alkali hydroxide and the liberated base is extracted with ether. This ether extract is dried and distilled. The free base of N-benzyl-N-methyl - 3 - trifluoromethyl-phenethyl-amine, a colorless liquid, is obtained. Yield is 24 g. (82 percent), B.P. 109–110° C./0.3 mm. Analysis.—Calculated for $C_{17}H_{18}F_3N$: Neut. Equiv. 293. Found: Neut. Equiv. 294

EXAMPLE 2

N,N-diethyl-3-trifluoromethyl-phenethyl amine

A mixture of 15 g. (0.0685 mole) 3-trifluoromethyl phenethyl-chloride and of 12 g. (0.167 mole) diethylamine and of isopropyl alcohol is heated in a pressure bottle at 110° C. for 12 hours. The reaction mixture is worked up analogous to Example 1. Upon distillation 7.5 g. (48.5 percent) of product is obtained. B.P. 118–1200 C./25 mm. Analysis.—Calculated for $C_{13}H_{18}F_3N$: Neut. Equiv., 245. Found: Neut. Equiv., 242.

EXAMPLE 3

N-(p-chlorobenzyl)-N-methyl-3-trifluoromethyl-phenethylamine

The free base of this compound is prepared by reacting 8 g. (0.038 mole) 3 - trifluoromethyl-phenethyl chloride and 6 g. (0.038 mole) N-p-chlorophenyl-N-methylamine in the presence of 6 g. (0.043 mole) $K_2CO_3$ and 20 milliliters isopropyl alcohol at 100° C. for 14 hours. The reaction mixture is worked up in a manner analogous to Example 1. Upon distillation 4.7 g. (37.7 percent) free base of N - (p-chlorobenzyl)-N-methyl-3-trifluoromethyl-phenethylamine is obtained. B.P. 132–134° C./0.5 mm. Analysis.—Calculated for $C_{17}H_{17}ClF_3N$: Neut. Equiv., 328. Found: Neut. Equiv., 324.

EXAMPLE 4

N-(3-trifluoromethyl-phenethyl)-morpholine

The free base of this compound was synthesized according to Example 1 by reacting 3-trifluoromethyl-phenethyl-chloride with morpholine. N-(3-trifluoromethyl-phenethyl)-morpholine is obtained in 84 percent yield. B.P. 80° C./0.3 mm. Analysis.—Calculated for $C_{14}H_{18}F_3N$: Neut. Equiv. 247. Found: Neut. Equiv. 249.

EXAMPLE 5

N-(3-trifluoromethyl-phenethyl)-piperidine

The free base of this compound was obtained according to Example 1 by reacting 3-trifluoromethyl-phenethyl chloride with piperidine. N-(3-trifluoromethyl-phenethyl)-piperidine is obtained in 70 percent yield. B.P. 78° C./0.4 mm. Analysis.—Calculated for $C_{14}H_{18}F_3N$: Neut. Equiv. 257. Found: Neut. Equiv., 260.

PREPARATION 4

Alpha-methyl-3-trifluoromethyl-phenethyl chloride

To a refluxing mixture of 77.3 g. (0.65 mole) of thionyl chloride in 350 milliliters of chloroform and 0.5 g. pyridine is added dropwise with vigorous stirring 120.4 g. (0.589 mole) of alpha-methyl-3-trifluoromethyl-phenethyl alcohol. After the addition is completed reflux is continued for two hours. Excess thionyl chloride and hydrochloric acid is removed in vacuo. The chloroform solution is briefly washed with water, bicarbonate solution and water, it is dried and distilled. Yield is 110 g. (90 percent), B.P. 103–105° C./25 mm.

The alpha-methyl - 3 - trifluoromethyl-phenethylamines are obtained by the interaction of the appropriate amines with alpha-methyl-3-trifluoromethyl-phenethyl chloride.

EXAMPLE 1

N-isopropyl-alpha-methyl-3-trifluoromethyl-phenethylamine

The free base of this compound is prepared according to Example 2 of Preparation 3 by the reaction of isopropylamine with alpha-methyl-3-trifluoromethyl-phenethyl-chloride. B.P. 126–128° C./25 mm. Analysis: Calculated for $C_{13}H_{18}F_3N$: Neut. Equiv., 245. Found: Neut. Equiv., 247.

EXAMPLE 2

N-benzyl-N-methyl-alpha-methyl-3-trifluoromethyl-phenethylamine

The free base of this compound is synthesized according to Example 1 of Preparation 3 by reacting alpha-methyl-3-trifluoromethyl-phenethyl-chloride with benzyl-methylamine. B.P. 113–115° C./0.5 mm. Analysis: Calculated for $C_{18}H_{20}F_3N$: Neut. Equiv., 307. Found: Neut. Equiv., 307.

PREPARATION 5

Benzoic acid, m-[2-(benzylmethylamino)-ethyl]methyl ester 20 g. of N-benzyl-N-methyl-3-trifluoromethyl-phenethylamine hydrochloride is dissolved in 40 g. of concentrated sulfuric acid and the resultant solution is heated on a water bath for three hours. The reaction mixture is then cooled and combined with 50 milliliters of methyl alcohol. This solution is refluxed for three hours at which time most of the excess methyl alcohol is removed by distillation. The residual mixture is cooled and poured slowly into 200 milliliters cold water. The acid aqueous solution is carefully made alkaline and extracted with ether. The ether extract is dried and anhydrous hydrochloric acid in ether is added. The crude hydrochloride salt thusly precipitated is recrystallized from methyl alcohol-ether and from isoamyl-alcohol-ether mixtures. 11.2 g. of white crystalline material of the hydrochloride salt is obtained. M.P. 150–151° C.

The hydrochloride salt is converted to the free base by addition of alkali hydroxide to the aqueous solution of the salt. The base is extracted with ether, and the ether removed in vacuo. Analysis: Calculated for $C_{18}H_{21}NO_2$: Neut. Equiv., 283. Found: Neut. Equiv., 287.

The free benzoic acid derivative is obtained by hydrolysis of the hydrochloride salt of the ester with hydrochloric acid and recrystallization of the thusly obtained crude m-[2-benzylmethylamino) ethyl] benzoic acid.

PREPARATION 6

Benzoic acid, m-[2-(benzylmethylamino)-ethyl] ethyl ester

Hydrolysis of N-benzyl-N-methyl - 3 - trifluoromethyl-phenethylamine with sulfuric acid, followed by esterification with ethyl alcohol according to Preparation 5 yields benzoic acid, m-[2 - (benzylmethylamino) - ethyl] ethyl ester. Analysis: Calculated for $C_{19}H_{23}NO_2$: Neut. Equiv., 297. Found: Neut. Equiv., 301.

PREPARATION 7

Benzoic acid, m-(2-morpholino-ethyl)-methyl ester

Above compound is obtained from 3-trifluoromethyl-phenylethyl-morpholine through hydrolysis followed by esterification with methyl alcohol according to Preparation 5. Analysis: Calculated for $C_{14}H_{19}NO_3$: Neut. Equiv., 249. Found: Neut. Equiv., 250.

PREPARATION 8

Benzoic acid, m-[2-(N-methylpiperazino) ethyl] methyl ester

Above compound is prepared from 3-trifluoromethyl-phenethyl-N-methylpiperazine according to Preparation 5. Analysis: Calculated for $C_{15}H_{22}N_2O_2$: Neut. Equiv., 262. Found: Neut. Equiv., 264.

PREPARATION 9

Benzoic acid, m-(2-piperidinoethyl)-methyl ester

Above compound is prepared from 3-trifluoromethyl-phenethyl piperidine according to Preparation 5. Analysis: Calculated for $C_{15}H_{21}NO_2$: Neut. Equiv., 247. Found: Neut. Equiv., 251.

PREPARATION 10

Benzoic acid, m-[2-(benzylethylamino)-ethyl] methyl ester

Hydrolysis of N-benzyl-N-ethyl-3-trifluoromethyl-phenethylamine followed by esterification with methyl alcohol according to Preparation 5 yields benzoic acid, m-[2-(benzylethylamino)-ethyl] methyl ester. Analysis: Calculated for $C_{19}H_{23}NO_2$: Neut. Equiv., 297. Found: Neut. Equiv., 299.

PREPARATION 11

Benzoic acid, m-[2-(N-benzyl-N-(2-methoxyethyl)-amino)-ethyl] methyl ester

Hydrolysis of N-benzyl-N-(2-methoxyethyl)-3-trifluoromethyl-phenethylamine followed by esterification with methyl alcohol according to Preparation 5 yields benzoic acid, m-[2-(N-benzyl-N-(2-methoxyethyl)-amino)-ethyl] methyl ester. Analysis: Calculated for $C_{20}H_{25}NO_3$: Neut. Equiv., 327. Found: Neut. Equiv., 330.

It is recognized that various changes and modifications of the present invention can be made and, to the extent that such variations incorporate the spirit of this invention, they are intended to be included within the scope of the appended claims.

I claim:

1. The process wherein a N-(3-trifluoromethylphenethyl)-amine selected from the group consisting of N-benzyl-N-methyl - 3 - trifluoromethyl-phenethyl-amine, N-(3-trifluoromethyl-phenethyl)-morpholine, N-(3-trifluoromethyl-phenethyl)-N-methyl-piperazine, N-(3 - trifluoromethyl-phenethyl)-piperidine, N-benzyl-N-ethyl-3-trifluoromethyl-phenethyl-amine and N - benzyl-N-(2-methoxyethyl)-3-trifluoromethyl-phenethyl-amine or a salt thereof is treated with one or more acids selected from the group consisting of sulfuric acid and hydrofluoric acid in the liquid phase so as to hydrolyze the trifluoromethyl group into the corresponding carboxylic acid.

2. The method of claim 1 wherein said acid is concentrated sulfuric acid.

3. The method of claim 1 wherein said trifluoromethyl-phenethyl amine is N-benzyl-N-methyl-3-trifluoromethyl-phenethyl-amine hydrochloride.

4. The method of claim 1 wherein said trifluoromethyl-phenethyl amine is N-(3-trifluoromethyl-phenethyl)-morpholine.

5. The method of claim 1 wherein said trifluoromethyl-phenethyl amine is 3-trifluoromethyl-phenethyl-N-methyl-piperazine.

6. The method of claim 1 wherein said trifluoromethylphenethyl amine is N-(3-trifluoromethyl-phenethyl)piperidine.

7. The method of claim 1 wherein said trifluoromethylphenethyl amine is N-benzyl-N-ethyl-3-trifluoromethyl-phenethylamine.

8. The method of claim 1 wherein said trifluoromethylphenethyl amine is N-benzyl-N-(2-methoxyethyl)-3-trifluoromethyl phenethylamine.

No references cited.

NICHOLAS S. RIZZO, Primary Examiner

J. TOVAR, Assistant Examiner

U.S. Cl. X.R.

260—247, 247.2 B, 268 R, 268 SY, 293.72, 293.81, 471 A, 518 R, 519, 570.6, 570.9; 424—248